United States Patent Office 3,447,937
Patented June 3, 1969

3,447,937
STEAM CURED CEMENT AND PROCESS
Arthur T. Hersey, Easton, and Lorrin T. Brownmiller, Bath, Pa., assignors to Alpha Portland Cement Company, Easton, Pa., a corporation of New Jersey
No Drawing. Filed Aug. 6, 1965, Ser. No. 477,972
Int. Cl. C04b 11/00, 7/00
U.S. Cl. 106—89   6 Claims

ABSTRACT OF THE DISCLOSURE

A portland cement composition useful in the production by steam curing of cement products having low shrinkage, high strength and hardness characteristics which consists essentially of a pulverized clinker material of hydraulic calcium silicates and has uniformly mixed therewith a pulverized calcium sulfate. The pulverized mixture has a fineness in excess of approximately 2600 Wagner surface area and contains less than approximately 4.0% by weight of tricalcium aluminate and in excess of approximately 3.0% by weight of sulfur trioxide.

---

This invention relates to an improved cement composition and method useful in the production by steam curing of cement products having low shrinkage and high strength and hardness characteristics.

Hydraulic cements belong to the general class of cements which harden upon reaction with water and curing or aging to produce a water resistant concrete product. Portland cement is one of the more useful and commonly employed hydraulic cements in the construction industry and in the production of precast concrete products.

By ASTM specification (C150–63) portland cement is defined as "the product obtained by pulverizing clinker consisting essentially of hydraulic calcium silicates, to which no additions have been made subsequent to calcination other than water and/or untreated calcium sulfate, except that additions not to exceed 1.0% of other materials may be interground with the clinker at the option of the manufacturer, provided such material in the amounts indicated have been shown to be not harmful . . . ."

The hardening, strength, durability and usefulness of portland cement as a construction material depend on the reaction of the compounds of the clinker with water and with the $SO_3$ (generally supplied by gypsum or anhydrite) which transforms the anhydrous compounds of the cement clinker, such as tricalcium silicate, dicalcium silicate, tricalcium aluminate, tetracalcium aluminoferrite and $SO_3$, into complex hydrates. As hydrates are formed they knit together to form a compact, hard mass which binds the aggregates to produce concrete for all types of construction, for concrete block and for other cement and concrete products. The temperatures at which hydration reactions occur cause the formation of hydrates of varying compositions and varying properties.

The portland cements heretofore employed in the construction industry have been generally designed and intended for curing at atmospheric temperature and it has been traditional to cure cement in this fashion at atmospheric temperature. More recently, it has become common practice to cure concrete and concrete products by the use of steam since this accelerates the rate of hydration and permits the use of factory production methods for protection of precast units with sufficient strength and stability to be used in the construction industry. In addition, products can be made by steam curing procedures that are superior in other respects to products cured at ordinary temperatures.

The hydrates formed during steam curing of concrete differ from the hydrates formed at normal out-door temperatures. Up to the present time, manufacturers of steam cured products have accepted the common types of cements which were the only types available under existing specifications, usually type I (general purpose cement), type II (moderate heat of hydration, moderate sulfate resistant cement) or type III (high early strength cement) or their air-entraining counterparts, for use in the manufacture of other steam cured products. The acceptance of these types of cement has been based largely on ready availability of these three most common types of cement, and a lack of knowledge of the best chemical and physical composition of cement for use in steam cured products. The use of these common types of cements for the production by steam curing of concrete products has resulted in a number of difficulties and disadvantages, including undue shrinkage and inadequate strength and hardness.

It is a particular object of the present invention to overcome the difficulties heretofore encountered in the steam or heat curing of concrete products and to provide an improved hydraulic cement composition and method useful in the production by steam or heat curing of concrete products having relatively low shrinkage and relatively high strength and hardness characteristics.

Further objects include the production of an improved cement composition and method useful in steam curing wherein the cement may be prepared in a simple fashion using conventional procedures and equipment and wherein concrete products may be made therefrom by steam curing in a simple and conventional manner.

In accordance with our invention we have found that improved steam-cured products, such as cement blocks, can be made by compounding a portland cement clinker with a low tricalcium aluminate content, under approximately 4.0% by weight, and thereafter grinding it to a high degree of fineness in excess of approximately 2600 Wagner surface area, and more specifically by grinding it with calcium sulfate (such as gypsum or anhydrite) so that the resultant $SO_3$ content of the cement is in excess of that permitted in current specifications for cement with less than 8.0% tricalcium aluminate. In other words, gypsum or anhydrite should be added in such quantities that the $SO_3$ content of the cement is in excess approximately of 3.0% by weight. In a preferred embodiment of our invention we incorporate in excess of approximately 50% by weight of tricalcium silicate in the cement mixture.

In making our improved cement composition the general procedures used in making portland cement are followed. However, the raw materials are proportioned so as to produce a clinker having a lower tricalcium aluminate content. In addition, a higher proportion of calcium sulfate is mixed with the clinker and the clinker and additions are ground to a smaller particle size or greater degree of fineness than heretofore generally employed.

As heretofore pointed out, hydraulic calcium silicates form the major portion of portland cement and accordingly raw materials must be selected to provide these components in the required amounts.

The CaO or lime component may be supplied in the usual manner from the primary raw material which may be limestone, shells or waste materials from the chemical industry having a high CaO content. For this purpose, I prefer to employ limestone or oyster shells. The $SiO_2$ or silica content may be provided in the usual manner from the secondary raw material which may be clay, sand, slag, shale or sandstone or we may employ limestone having a high silica content. For this purpose we prefer to employ sand or shale.

The $Al_2O_3$ or alumina and $Fe_2O_3$ or ferric oxide content, which aid in the incipient fusion or sintering operation hereinafter described, may also be supplied in the usual manner from the primary and secondary raw materials having $Al_2O_3$ and $Fe_2O_3$ content present in the desired proportions. If they are not present in the primary and secondary raw materials in the required proportions, they may be supplied in the desired quantities by adding bauxite, iron ore or other sources of $Al_2O_3$ and $Fe_2O_3$.

In order to form a clinker of the desired type having the proper chemical compounds, the raw materials must be carefully proportioned, they must be homogeneously mixed and they must be finely ground preferably so that at least 95% of the mixtures passes through a 50 mesh screen.

As is well known in the portland cement industry, the proportions of raw materials should be such so as to avoid lime oversaturation. In other words, the quantity of lime present in the raw material should not be more than can, under the conditions of burning or sintering, be combined with the hydraulic factors, i.e. silica, alumina and ferric oxide since excessive free lime content in a portland cement material is highly undesirable. A high tricalcium silicate content relative to the dicalcium silicate present in the clinker is desirable. We prefer to include in excess of 50% by weight of tricalcium silicate in the cement mixture and accordingly the clinker should have in excess of approximately 53% by weight of tricalcium silicate. However, in order to insure against an excessive free lime content in the clinker, the proportions of material should not be based upon the utilization of all of the lime content for the production of tricalcium silicate to the exclusion of dicalcium silicate. Instead, they should be proportioned so as to produce a major proportion of tricalcium silicate, a minor proportion of dicalcium silicate along with smaller quantities of tetracalcium aluminoferrite and tricalcium aluminate. Since the proportion of tricalcium aluminate in the final cement material should be less than 4.0% by weight and preferably less than 3.5% by weight, it follows that the proportion of tricalcium aluminate in the clinker should be less than approximately 4.3% by weight and preferably less than approximately 3.8% by weight.

To prevent an excessive free lime residue in the clinker for portland cement, the maximum permissible lime content in the mixture of raw materials should be determined from the well-established Bogue formulae. In addition, the quantites or proportions of all of the raw materials to obtain the above indicated desired clinker composition can be obtained from the Bogue formulae. The Bogue formulae are set forth in ASTM specification for portland cement C150–63 and also in "The Chemistry of Portland Cement," R. H. Bogue, 2nd Edition, published by Reinhold Publishing Corporation. The Bogue formulae are as follows:

Tricalcium silicate = $(4.071 \times \text{percent CaO}) - (7.600 \times \text{percent } SiO_2) - (6.718 \times \text{percent } Al_2O_3) - (1.430 \times \text{percent } Fe_2O_3) - (2.852 \times \text{percent } SO_3)$ Dicalcium silicate = $(2.867 \times \text{percent } SiO_2) - (0.7544 \times \text{percent } C_3S)$ Tricalcium aluminate = $(2.650 \times \text{percent } Al_2O_3) - (1.692 \times \text{percent } Fe_2O_3)$ Tetracalcium aluminoferrite = $3.043 \times \text{percent } FeO_3$ Since in the present invention it is desired to reduce the proportion of tricalcium aluminate in the clinker and in the final cement mixture, the quanity of alumina present in the raw material mixture should not exceed approximately 3.0% by weight of the entire mixture.

The raw materials indicated above in the proper protions determined as indicated above, are thereafter thoroughly mixed together and ground so as to produce a homogeneous mixture of finely ground material so that preferably at least 95% of the mixture passes through a 50 mesh screen. The grinding procedure may be either the wet or dry process as used in the portland cement industry.

Thereafter the prepared homogenized raw materials are then fed into rotary kilns for burning. In the burning process the free water is evaporated first of all at the feed end or the low temperature end of the kiln. As the raw material moves down the kiln its temperature gradually increases and the water of crystallization of certain minerals in the raw material is driven off followed by the expulsion of the $CO_2$ present in the limestone or shell. The latter reaction occurs at about 1600° F. and up to this point practically no chemical combination of the elements to form the clinker compounds has occurred. Following the expulsion of the $CO_2$, the temperature of the raw materials is increased rapidly in the burning zone at the discharge end of the kiln and the material is generally exposed directly to the intense heat of the flame of ignited fuel. It is in this burning zone of the kiln occupying about 15 to 20% of the kiln length that the materials are brought to a temperature of incipient fusion or sintering and where the final combinations of the chemical compounds are brought about. Incipient fusion or sintering occurs when between approximately 20% and 30% of the material is melted to a viscous liquid. As is well known, incpient fusion can be determined from the stickiness or cohesiveness of the material in the kiln which causes an agglomeration of it into rounded pellets which when cool form hard, dense more or less rounded clinker, usually ⅛ inch to 2 inches in diameter. Incipient fusion generally takes place between 2600° and 2800° F. When incipient fusion has occurred the material is considered to be burned to completion. Thereafter the clinker is cooled in the usual manner.

The clinker thus produced has a tricalcium aluminate content of less than approximately 4.0% by weight and preferably less than 3.8% by weight. Thereafter the clinker is mixed and ground to a high degree of fineness with a source of $SO_3$ preferably calcium sulfate in the form of gypsum or anhydrite. Sufficient calcium sulfate should be mixed with the clinker so that the $SO_3$ of the ground cement material is at least 3.0% by weight and preferably between 3.5% and 4.5% by weight. The calcium sulfate and the clinker should be ground to a high degree of fineness in excess of approximately 2600 Wagner surface area, preferably in excess of approximately 2700 Wagner surface area, and the finely ground material should be thoroughly mixed together to produce a homogeneous mass. One procedure for ensuring a homogeneous mass is to intergrind the clinker and calcium sulfate together. By Wagner surface area we means the spacific surface area expressed as total surface area in square centimeters per gram of cement as determined by ASTM Designation C115–58, "Standard Method of Test for Fineness of Portland Cement by the Turbidimeter."

Other additives which impart desirable properties to portland cement concrete may also be incorporated in the cement during this grinding procedure. Thus, any of the well known air entraining agents may be incorporated in the cement at this time.

The cement material embodying our invention containing the relatively low percentage of tricalcium aluminate and the relatively high percentage of $SO_3$ and ground to the indicated high degree of fineness may be advantageously used in the production by steam curing of cement products having low shrinkage and high strength and hardness characteristics. Thus, the current may be mixed with aggregate, water and other additives where desired in the usual manner and in the usual proportions and molded into products such as concrete blocks. After the usual preset period the molded product is subjected to live steam at atmospheric pressure in a chamber until the temperature of the chamber reaches between approximately 140° F. and 165° F. for heavy weight aggregate and 140° F and 180° F. for light weight aggregate. The temperature is maintained for a minimum period of 3 hours and preferably longer and the introduction of steam is then discontinued and the units allowed to soak in the chamber as it slowly cools and the blocks are permitted to remain in the chamber until the total elapsed time is approximately 10 hours. The blocks are then removed and placed in storage for additional curing and drying.

Instead of being steam cured at atmospheric pressures, the products may be subjected to autoclaving or high pressure steam curing. Thus, after the products have been molded and after the preset period, the blocks are placed in an autoclave and steam is introduced so that a temperature of approximately 350° F. and a pressure of approximately 120 p.s.i.g. is attained within 2 hours. The autoclaves are kept in operation under these conditions for a minimum of 4 hours and preferably longer. The supply of steam is then discontinued and the valves on the autoclaves are cautiously opened to bring the pressure to atmospheric conditions within a period of approximately ½ hour. As soon as normal pressures are attained within the autoclave the normal procedure is to open the autoclave and immediately remove the molded products to storage for additional curing and drying.

Concrete products thus produced by steam curing from our improved cement have low shrinkage and high strength and hardness characteristics. The following Examples 1, 2 and 3 are typical examples of portland cement compositions and the procedures for making the same in accordance with our invention. In each of the examples the following raw materials having the following analyses are employed:

ANALYSIS OF RAW MATERIALS

|  | Limestone, percent | Shale, percent | Sand, percent | Pyrite cinder, percent |
|---|---|---|---|---|
| $SiO_2$ | 7.34 | 66.87 | 97.81 |  |
| $Al_2O_3$ | 1.67 | 13.37 | 1.01 |  |
| $Fe_2O_3$ | 0.98 | 8.38 | 0.69 | 98.00 |
| CaO | 46.97 | 0.50 |  |  |
| MgO | 2.55 | 0.30 |  |  |
| Sulphur as $SO_3$ | 0.39 | 0.20 |  |  |
| Misc. and loss | 40.10 | 10.38 | 0.49 | 2.00 |

Example 1

A clinker material embodying our invention is made in accordance with the procedures outlined above, using 89% or 89 parts by weight of limestone, 6% or 6 parts by weight of shale, 4% or 4 parts by weight of sand, and 1% or 1 part by weight of pyrite cinder. The clinker is prepared as indicated above by mixing the limestone, shale, sand and pyrite cinder in the indicated proportions so as to produce a homogeneous mixture which is ground to a fineness so that preferably in excess of 95% would pass through a 50 mesh screen. Thereafter, the homogeneously ground and mixed raw materials are burned in a kiln as described above to incipient fusion or to the sintering temperature necessary to complete the chemical reaction and to form the clinker. After cooling, the clinker is interground with 7.55% or 7.55 parts by weight of gypsum to make the cement composition and the mixture is ground to a fineness in excess of 2600 Wagner surface area. The oxide analysis and the chemical compound analysis of the composition of both the clinker and of the cement are shown in the following table:

|  | Oxide analysis, percent | |
|---|---|---|
|  | Clinker | Cement |
| SiO | 22.49 | 20.79 |
| $Al_2O_3$ | 3.63 | 3.36 |
| $Fe_2O_3$ | 3.70 | 3.42 |
| CaO | 65.10 | 62.64 |
| MgO | 3.55 | 3.28 |
| $SO_3$ | 0.56 | 4.03 |
| Misc. and Loss | 0.97 | 2.48 |

| | Compound composition, percent | |
|---|---|---|
|  | Clinker | Cement |
| Tricalcium silicate | 62.8 | 58.1 |
| Dicalcium silicate | 17.5 | 15.8 |
| Tricalcium aluminate | 3.4 | 3.2 |
| Tetracalcium alumino-ferrite | 11.3 | 10.4 |

The cement thus prepared was found to be particularly suitable for the production by steam curing, as described above, of cement products having low shrinkage and high strength and hardness characteristics.

Example 2

The clinker material embodying our invention is made in accordance with the procedures outlined above using 87% or 87 parts by weight of limestone, 11% or 11 parts by weight of shale and 2% or 2 parts by weight of pyrite cinder. The clinker is prepared as indicated above by mixing the limestone, shale and pyrite cinder in the indicated proportions so as to produce a homogeneous mixture which is ground to a fineness so that preferably in excess of 95% would pass through a 50 mesh screen. Thereafter the homogeneously ground and mixed raw materials are burned in a kiln as described above to incipient fusion or to the sintering temperature necessary to complete the chemical reaction and to form the clinker. After cooling, the clinker is interground with 6.54% or 6.54 parts by weight of gypsum to make the cement composition and the mixture is ground to a fineness in excess of 2600 Wagner surface area. The oxide analysis and the chemical compound analysis of the composition of both the clinker and the cement are shown in the following table:

|  | Oxide analysis, percent | |
|---|---|---|
|  | Clinker | Cement |
| $SiO_2$ | 21.26 | 19.87 |
| $Al_2O_3$ | 4.51 | 4.21 |
| $Fe_2O_3$ | 5.77 | 5.39 |
| CaO | 63.27 | 61.26 |
| MgO | 3.48 | 3.25 |
| $SO_3$ | 0.56 | 3.57 |
| Misc. and Loss | 1.15 | 2.45 |

| | Compound composition, percent | |
|---|---|---|
|  | Clinker | Cement |
| Tricalcium silicate | 55.9 | 52.5 |
| Dicalcium silicate | 18.8 | 17.6 |
| Tricalcium aluminate | 2.2 | 2.0 |
| Tetracalcium alumino-ferrite | 17.6 | 16.4 |

The cement thus prepared was found to be particularly suitable for the production by steam curing, as described above, of cement products having low shrinkage and high strength and hardness characteristics.

Example 3

The clinker material embodying our invention is made in accordance with the procedures outlined above using 90% or 90 parts by weight of limestone, 3.75% or 3.75 parts by weight of shale, 5.5% or 5.5 parts by weight of sand and 0.75% or 0.75 part by weight of pyrite cinder. The clinker is prepared as indicated above by mixing the limestone, shale, sand and pyrite cinder in the indicated proportions so as to produce a homogeneous mixture which is ground to a fineness so that preferably in excess of 95% would pass through a 50 mesh screen. Thereafter the homogeneously ground and mixed raw materials are burned in a kiln as described above to incipient fusion or to the sintering temperature necessary to complete the chemical reaction and to form the clinker. After cooling, the clinker is interground with 7.92% or 7.92 parts by weight of gypsum to make the cement composition and the mixture is ground to a fineness in excess of 2600 Wagner surface area. The oxide analysis and the chemical compound analysis of both the clinker and of the cement are shown in the following table:

|  | Oxide analysis, percent SL | |
|---|---|---|
|  | Clinker | Cement |
| $SiO_2$ | 22.63 | 20.84 |
| $Al_2O_3$ | 3.22 | 2.96 |
| $Fe_2O_3$ | 3.08 | 2.84 |
| CaO | 66.04 | 63.39 |
| MgO | 3.61 | 3.32 |
| $SO_3$ | 0.56 | 4.20 |
| Misc. and Loss | 0.86 | 2.45 |

|  | Compound composition, percent | |
|---|---|---|
|  | Clinker | Cement |
| Tricalcium silicate | 69.2 | 63.8 |
| Dicalcium silicate | 12.7 | 11.7 |
| Tricalcium aluminate | 3.3 | 3.0 |
| Tetracalcium alumino-ferrite | 9.4 | 8.6 |

The cement mixture thus prepared is particularly suitable for the production by steam curing as described above, of cement products having low shrinkage and high strength and hardness characteristics.

The following are typical examples of concrete mixtures utilizing our improved cement for the production of concrete products by steam curing.

Example 4

A cement mixture embodying our invention is mixed with aggregate material, water and an air entraining additive in the following proportions:

| Cement | lbs__ | 156½ |
|---|---|---|
| 5/16" stone | lbs__ | 850 |
| Sand | lbs__ | 1100 |
| Air entraining agent | oz__ | 2 |
| Water, in an amount as needed for proper workability. | | |

The materials are thoroughly mixed together and are then molded into a concrete product such as a concrete block. The concrete block is preset and subjected to atmospheric steam curing in the manner described above. The finished concrete block has relatively low shrinkage and high strength and hardness characteristics.

Example 5

The cement mixture embodying our invention is mixed with aggregate material, water and an air-entraining additive in the following proportions:

| Cement | lbs__ | 188 |
|---|---|---|
| 3/8" gravel | lbs__ | 433 |
| Sand | lbs__ | 1492 |
| Air entraining agent | oz__ | 2 |
| Water, in an amount as needed for proper workability. | | |

The materials are thoroughly mixed together and are then molded into a concrete product, such as a concrete block. The concrete block is preset and subjected to atmospheric steam curing in the manner described above.

Example 6

This example is a typical concrete mix suitable for use in making concrete products employing high pressure steam curing procedures. The cement mixture embodying our invention is mixed with aggregate material, water and air entraining additive in the following proportions:

| Cement | lbs__ | 101½ |
|---|---|---|
| 5/16" stone | lbs__ | 850 |
| Sand | lbs__ | 1100 |
| Silica flour | lbs__ | 55 |
| Air entraining agent | oz__ | 2 |
| Water, in an amount as needed for proper workability. | | |

The materials are thoroughly mixed together and are then molded into a concrete product, such as a concrete block. The concrete block is preset and then subjected to high pressure steam curing in the manner described above. The finished concrete block has relatively low shrinkage and high strength and hardness characteristics.

Variations in proportions and changes in cement composition may be made within the limits indicated in the specification without departing from the scope of our invention as defined in the appended claims.

We claim:

1. A cement composition useful in the production by steam curing of cement products having low shrinkage and high strength and hardness characteristics, consisting essentially of: a pulverized clinker material consisting primarily of hydraulic calcium silicates and having uniformly mixed therewith a pulverized gypsum, said mixture being ground to a fineness in excess of approximately 2600 Wagner surface area and containing less than approximately 4.0% by weight of tricalcium aluminate and between approximately 3.0% and 4.5% by weight of sulfur trioxide.

2. A cement composition as set forth in claim 1 in which the percentage by weight of tricalcium aluminate is less than approximately 3.5%.

3. A cement composition as set forth in claim 1 in which the percent by weight of sulfur trioxide is between approximately 3.5% and 4.5%.

4. A cement composition as set forth in claim 1 in which the Wagner surface area of the particles of the mixture is in excess of approximately 2700.

5. A cement composition as set forth in claim 1 in which the hydraulic calcium silicates include tricalcium silicate and dicalcium silicate and the tricalcium silicate constitutes at least 50% by weight of the cement mixture.

6. A cement composition useful in the production by steam curing of cement products having low shrinkage and high strength and hardness characteristics, consisting essentially of: a pulverized clinker material consisting primarily of hydraulic calcium silicates and having uniformly mixed therewith a pulverized gypsum, said mixture being ground to a fineness in excess of approximately 2700 Wagner surface area and containing less than approximately 3.5% by weight of tricalcium and between approximately 3.5% and 4.5% by weight of sulfur trioxide.

References Cited

UNITED STATES PATENTS 2,837,436  6/1958  Chapman et al. _____ 106—97
3,021,291  2/1962  Thiessen _____ 106—97

JAMES E. POER, *Primary Examiner.*

U.S. Cl. X.R.

106—97, 102

UNITED STATES PATENT OFFICE
CERTIFICATE OF CORRECTION

Patent No. 3,447,937                                            June 3, 1969

Arthur T. Hersey et al.

It is certified that error appears in the above identified patent and that said Letters Patent are hereby corrected as shown below:

Column 3, line 61, "$FeO_3$" should read -- $Fe_2O_3$ --; line 64, "quanity" should read -- quantity --. Column 4, line 22, "incpient" should read -- incipient --; line 48, "means" should read -- mean --; line 49, "spacific" should read -- specific --; line 64, "current" should read -- cement --. Column 7, line 4, cancel "SL". Column 8, line 51, after "tricalcium" insert -- aluminate --.

Signed and sealed this 9th day of June 1970.

(SEAL)
Attest:

Edward M. Fletcher, Jr.                          WILLIAM E. SCHUYLER, JR.
Attesting Officer                                          Commissioner of Patents